July 13, 1965 — C. E. JOUANNY — 3,193,935
ADJUSTABLE LINEAR-DIMENSION GAUGE
Filed Oct. 29, 1962
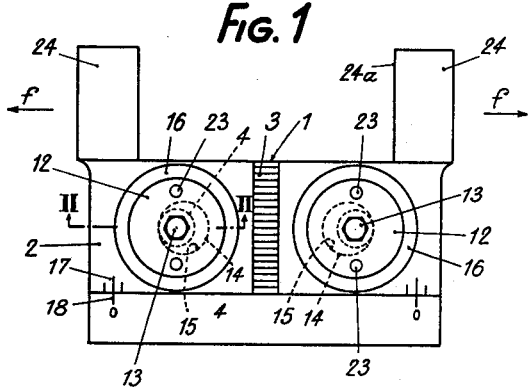
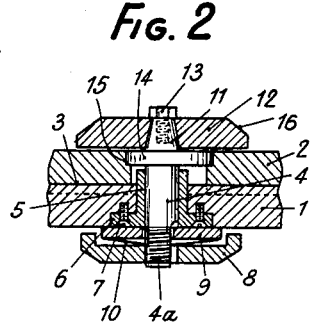
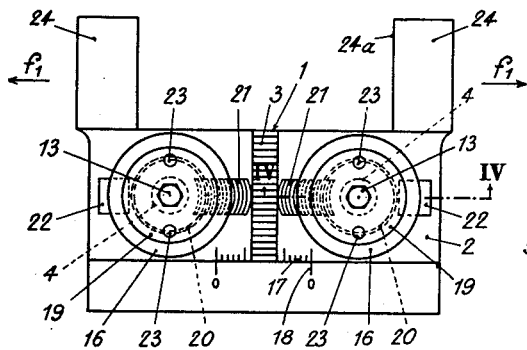
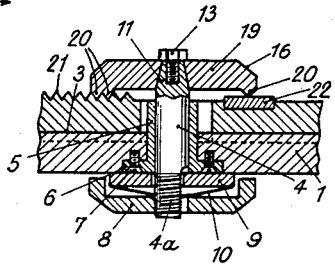
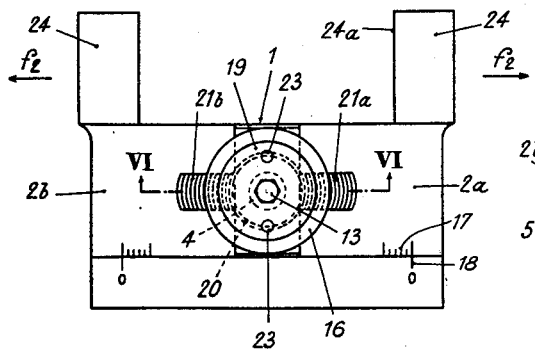
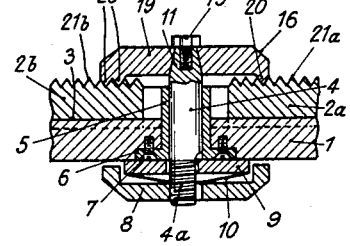
INVENTOR
CLEMENT E. JOUANNY
By Irwin S. Thompson
ATTY.

United States Patent Office 3,193,935
Patented July 13, 1965

3,193,935
ADJUSTABLE LINEAR-DIMENSION GAUGE
Clement Eugene Jouanny, 33 rue Robert Lindet,
Paris, France
Filed Oct. 29, 1962, Ser. No. 233,631
Claims priority, application France, Mar. 12, 1962,
890,710, Patent 1,324,965
4 Claims. (Cl. 33—143)

The present invention relates in general fashion to measuring apparatuses such as adjustable linear-dimension gauges.

It is already known to constitute gauges by means of two or more jaws which are movable in relation to one another and are guided in rectilinear relative paths which are precisely defined by means of appropriate notchings or groovings. For the measurement, a relative displacement of the jaws is effected in order to bring the measuring parts provided thereon to the desired spacing, which is determined by means of graduations provided on matching elements of the gauge.

One of the purposes of the invention is to provide improvements in the measuring apparatuses or gauges of this type in order that a play-free control may be obtained of the mutually movable jaws, while permitting their easy displacement.

The invention is carried out in a measuring apparatus such as an adjustable linear dimension gauge comprising at least two jaws movable in relation to one another which are guided one upon the other by a preferably triangular notching, the two jaws being retained in the assembled position by a spindle passing through aligned orifices of the said jaws, this spindle being locked in translation in the fixed jaw and carrying control elements co-operating with matching control elements provided on the movable jaw, one threaded end of this spindle receiving a nut which is separated from the adjacent jaw by a bearing washer associated with an elastic element, while its other end carries an abutment element or plate which bears directly or indirectly upon the adjacent jaw.

The use of a bearing washer associated with an elastic element, between the nut provided at one end of the spindle and the adjacent jaw, permits of obtaining a play-free assembly of the two jaws which is capable of supplying the requisite precision, while retaining a sufficiently smooth control. The compression of the elastic element permits of making the control firmer or of effecting the locking of the gauge, while the bearing washer which is engaged on a non-circular part of the spindle by means of an orifice of corresponding shape bears upon the associated jaw and permits a uniform rotation without jamming or gripping, especially by reason of the large area of contact then obtained.

The other end of the spindle can carry a cone or a shouldered cylindrical part receiving the abutting plate, which can be locked for example by means of a screw.

The spindle is preferably journalled in the fixed jaw by means of a bearing bush which according to need can be eccentric in order to permit perfect adjustment, this bush being advantageously of anti-friction metal and preferably possessing a flange directed towards the aforementioned nut, this flange facilitating its securing upon the fixed jaw and co-operating with the bearing washer.

According to one possible form of embodiment, the spindle carries in alignment with the movable jaw and outside of the bearing bush a cam or an eccentric which can be provided with one or more lobes and can move in an appropriate recess of the movable jaw.

According to another form of embodiment, the abutting plate carries on its face directed towards the movable jaw a spiral threading, and this jaw possesses a threaded table with which the aforementioned threading cooperates to cause a longitudinal relative displacement on angular movement of the spindle. In this case an element for the protection of the spiral threading, such as a small plate of fibre, is preferably provided opposite to the threaded table, in relation to the spindle.

According to yet a further form of embodiment there are provided two movable jaws guided in the above-indicated manner, carrying threaded tables co-operating with the spiral threading of the abutting plate. In this case the displacement obtained is twice that of the previous form of embodiment.

The abutting plate advantageously possesses a peripheral chamfer. Each movable jaw is further graduated so as to permit the reading of the measurement against an associated reference mark carried by the fixed jaw, or vice versa. This plate can be disengaged from the cone or cylindrical part, adjusted angularly to the desired position, then relocked as desired.

The dimensions of the apparatuses or gauges according to the invention are those necessary for the operation intended upon the workpieces to be produced or manufactured and the measuring parts which are external and/or internal can be provided with contact surfaces of hard material, for example of tungsten carbide.

The invention will be better understood by reference to the following description relating to the accompanying drawing, which is given by way of non-limitative example, and wherein:

FIGURE 1 represents a measuring apparatus such as an adjustable linear dimension gauge, in accordance with the invention, showing one embodiment of this apparatus;

FIGURE 2 is a view in section along the line II—II in FIGURE 1;

FIGURE 3 is a view similar to FIGURE 1, showing a second embodiment;

FIGURE 4 is a view in section along the line IV—IV in FIGURE 3;

FIGURE 5 is a view similar to FIGURE 1 but showing a third embodiment; and

FIGURE 6 is a view in section along the line VI—VI in FIGURE 5.

The measuring apparatus as represented in FIGURE 1 comprises, in its first embodiment, a fixed jaw 1 and a movable jaw 2 which are guided one upon the other by a triangular notching 3, the two jaws 1 and 2 being retained in the assembled position by a spindle 4 passing through aligned orifices of the said jaws and journalled in the fixed jaw 1 by means of a bearing bush 5, advantageously of anti-friction metal, possessing a flange 6 permitting the securing of the bearing bush 5 by means of screws 7 upon the fixed jaw 1.

The spindle 4 comprises a threaded part 4a intended to receive a locking nut 8 which is separated from the fixed jaw 1 by a bearing washer 9 which is engaged on a non-circular part of the spindle 4 by means of an orifice of corresponding shape, and is associated with an elastic washer 10.

The other end of the spindle 4 carries a cone 11 on which there is engaged an abutting plate 12 which can be locked on this cone by means of a screw or collar 13. According to the form of embodiment as represented in FIGURES 1 and 2, the spindle 4 carries, in alignment with the movable jaw 2 and outside of the bearing bush 5, a cam or eccentric 14 which can move in an appropriate recess 15 of this movable jaw 2. On a movement of the spindle 4 the eccentric 14 causes the longitudinal displacement of the movable jaw 2 in the direction of the arrow $f$ (FIGURE 1).

The abutting plate 12 possesses a peripheral chamfer 16. A graduation 17 is provided on the movable jaw 2 in order to permit the reading of the measurement opposite a reference mark 18 carried on the fixed jaw 1.

These graduations can be of any desired type and can form a vernier scale.

In the second form of embodiment as represented in FIGURE 3 and as shown in section in FIGURE 4, there may be seen the same elements as in the first form of embodiment but in this example the spindle 4 is associated with an abutting plate 19 which carries, on its face directed towards the movable jaw 2, a spiral threading 20 co-operating with a threaded table 21 carried by the movable jaw 2, in order to cause a relative longitudinal displacement of the movable jaw 2 in the direction of the arrow $f_1$ (FIGURE 3) on angular movement of the spindle 4. An element for the protection of the spiral threading 20, constituted by a fibre plate 22, is fixed on the movable jaw 2 opposite the threaded table 21 in relation to the spindle 4.

In the third form of embodiment as represented in FIGURE 5 and as seen in section in FIGURE 6, two movable jaws 2a and 2b are provided, each carrying a threaded table 21a and 21b co-operating with the spiral threading 20 of the abutting plate 19. In this example the two movable jaws 2a and 2b move simultaneously in the direction of the arrows $f_2$ (FIGURE 5) on angular movement of the spindle 4. In this case the displacement obtained is twice that of the previous example. The movable jaws comprise a graduation 18 each for the purpose of permitting reading against the graduation 17 provided on the plate 19.

The abutting plates 12 and 19 can be disengaged from the cone 11, adjusted angularly to the desired position, then relocked as desired with the aid of screws or bolts 13.

The locking nuts 8 and the abutting plates 12 and 19 comprise blind holes 23 permitting, with the aid of an appropriate key, of effecting the slackening and the locking of the nuts 8 and of causing the angular movement of the spindle 4. The use of the bearing washer 9 associated with the elastic washer 10 between the nut 8 and the fixed jaw 1 permits of obtaining a play-free assembly of the two jaws 1 and 2, capable of furnishing the required precision while retaining a sufficiently smooth control.

The measuring parts 24 can be provided, on their internal faces 24a or external faces 24b, with contact surfaces of hard material, for example of tungsten carbide.

Naturally modifications of detail can be applied to this embodiment, within the range of technical equivalence, without thereby departing from the scope of the present invention.

I claim:

1. An adjustable linear-dimension gauge comprising a stationary jaw, at least one movable jaw, means for guiding said jaws for movement relative to each other, said stationary jaw having a bore therein, a spindle rotatably mounted within said bore, said movable jaw having an orifice therein, said orifice being of a size greater than said spindle to allow for the movement of the movable jaw relative to said spindle, the ends of said spindle projecting from the jaws, a plate rigidly mounted upon one end of said spindle, means rotatable with said plate and spindle and cooperating with said movable jaw for moving the same relative to said stationary jaw, an adjustable nut provided on the other end of said spindle, a bearing washer located on said spindle between said nut and said stationary jaw, a spring washer clamped between said nut and said bearing washer, and a bearing bush made of anti-friction metal surrounding said spindle, said bush being provided with an exposed flange, said bearing washer being rotatable with said spindle and being pressed against said flange by said spring washer.

2. An adjustable linear-dimension gauge comprising a stationary jaw, at least one movable jaw, means for guiding said jaws for movement relative to each other, said stationary jaw having a bore therein, a spindle rotatably mounted within said bore, said movable jaw having an orifice therein, said orifice being of a size greater than said spindle to allow for the movement of the movable jaw relative to said spindle, the ends of said spindle projecting from the jaws, a plate rigidly mounted upon one end of said spindle, a cam rigid with said spindle, said movable jaw having a recess therein, said recess cooperating with said cam for the control of said movable jaw, an adjustable nut provided on the other end of said spindle, a bearing washer located on said spindle between said nut and said stationary jaw, a spring washer clamped between said nut and said bearing washer, and a bearing bush made of anti-friction metal surrounding said spindle, said bush being provided with an exposed flange, said bearing washer being rotatable with said spindle and being pressed against said flange by said spring washer.

3. An adjustable linear-dimension gauge comprising a stationary jaw, two movable jaws, means for guiding said jaws for movement relative to each other, said stationary jaw having two bores therein, a spindle rotatably mounted within each bore, each movable jaw having an orifice therein, said orifice being of a size greater than said spindle to allow for the movement of said movable jaw relative to the corresponding spindle, the ends of said spindles projecting from the jaws, a plate rigidly connected to one end of each spindle, a spiral threading provided on said plate towards said movable jaw, a threaded table provided on each movable jaw for cooperation with said spiral threading of each plate for moving said movable jaws relative to said stationary jaw, an adjustable nut provided on the other end of each spindle, a bearing washer located on each spindle between said nut and said stationary jaw, a spring washer clamped between said nut and said bearing washer, and a bearing bush made of anti-friction metal surrounding each spindle, said bush being provided with an exposed flange, said bearing washer being rotatable with said spindle and being pressed against said flange by said spring washer.

4. An adjustable linear-dimension gauge comprising a stationary jaw, two movable jaws, means for guiding said jaws for movement relative to each other, said stationary jaw having a bore therein, a spindle rotatably mounted within said bore, said movable jaws being located on either side of said spindle, the ends of said spindle projecting from the jaws, a plate rigidly connected to one end of said spindle, spiral threadings provided on said plate towards said movable jaws, a threaded table provided on each movable jaw for cooperation with said spiral threadings of the plate for moving said movable jaws relative to said stationary jaw, an adjustable nut provided on the other end of said spindle, a bearing washer located on said spindle between said nut and said stationary jaw, a spring washer clamped between said nut and said bearing washer, and a bearing bush made of anti-friction metal surrounding said spindle, said bush being provided with an exposed flange, said bearing washer being rotatable with said spindle and being pressed against said flange by said spring washer.

References Cited by the Examiner

UNITED STATES PATENTS

| 1,392,825 | 10/21 | Gonzalez | 33—161 X |
| 2,019,359 | 10/35 | Oswin | 33—168 |
| 2,402,778 | 6/46 | Rottler | 33—164 |

FOREIGN PATENTS 973,778  9/50  France.

ISAAC LISANN, *Primary Examiner.*